US012519196B2

(12) United States Patent
Xiao et al.

(10) Patent No.: US 12,519,196 B2
(45) Date of Patent: Jan. 6, 2026

(54) RF FILTER AND COMMUNICATION DEVICE HAVING THE SAME

(71) Applicant: Telefonaktiebolaget LM Ericsson (publ), Stockholm (SE)

(72) Inventors: Yuhua Xiao, Beijing (CN); Juandi Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/702,564

(22) PCT Filed: Jan. 9, 2023

(86) PCT No.: PCT/CN2023/071331

§ 371 (c)(1),
(2) Date: Apr. 18, 2024

(87) PCT Pub. No.: WO2023/155643

PCT Pub. Date: Aug. 24, 2023

(65) Prior Publication Data

US 2024/0413514 A1 Dec. 12, 2024

(30) Foreign Application Priority Data

Feb. 18, 2022 (WO) ................ PCT/CN2022/076812

(51) Int. Cl.
*H01P 1/205* (2006.01)
*H01P 1/202* (2006.01)
(Continued)

(52) U.S. Cl.
CPC ............ *H01P 1/2053* (2013.01); *H01P 1/202* (2013.01); *H01P 7/04* (2013.01); *H04B 1/03* (2013.01); *H04B 1/08* (2013.01)

(58) Field of Classification Search
CPC ........ H01P 1/2053; H01P 1/205; H01P 1/202; H01P 1/203; H01P 1/20327;
(Continued)

(56) References Cited

U.S. PATENT DOCUMENTS

2002/0036552 A1* 3/2002 Niiranen ................ H01P 1/205 333/202
2012/0032760 A1 2/2012 Wurth et al.
(Continued)

FOREIGN PATENT DOCUMENTS

CN 208986148 U 6/2019
CN 209169350 U 7/2019
(Continued)

*Primary Examiner* — Stephen E. Jones
(74) *Attorney, Agent, or Firm* — Murphy, Bilak & Homiller, PLLC

(57) ABSTRACT

An RF filter, comprising a chassis (1) that defines a cavity, and a plurality of resonators (2*a*, 2*b*) that are disposed in the cavity, wherein at least one resonator (2) comprises a body part (21) that extends in a first plane from a first end to an opposite second end along a first direction, an enlarged portion (22) that is provided at the second end and extends in the first plane along a second direction substantially perpendicular to the first direction so as to have a larger width in the second direction than the body part (21), and a folded portion (23) that is formed by bending along a lateral edge of the enlarged portion (22) at an angle of about 90° so as to extend in a second plane substantially perpendicular to the the second direction. The folded portion (23) plays a role in forming a coupling of the resonator with an adjacent resonator. The body part (21), the enlarged portion (22) and the folded portion (23) are made of a metal strip line, or a strip-line made of non-metal base with a metallized surface. The folded positions of two adjacent resonators can achieve desired coupling polarity.

20 Claims, 10 Drawing Sheets

(51) Int. Cl.

| | |
|---|---|
| ***H01P 7/04*** | (2006.01) |
| ***H04B 1/03*** | (2006.01) |
| ***H04B 1/08*** | (2006.01) |

(58) Field of Classification Search

CPC ........ H01P 1/20336; H01P 1/201; H01P 1/20; H01P 7/00; H01P 7/04; H01P 7/08

See application file for complete search history.

(56) References Cited

U.S. PATENT DOCUMENTS

| | | | | |
|---|---|---|---|---|
| 2014/0327500 | A1 | 11/2014 | Shiokawa et al. | |
| 2014/0347148 | A1 | 11/2014 | Ruiz-Cruz et al. | |
| 2017/0278623 | A1 | 9/2017 | Leipold et al. | |
| 2025/0079681 | A1* | 3/2025 | Zheng | H01P 7/04 |

FOREIGN PATENT DOCUMENTS

| | | | |
|---|---|---|---|
| CN | 110556616 | A | 12/2019 |
| CN | 110752424 | A | 2/2020 |
| CN | 111786069 | A | 10/2020 |
| CN | 111952700 | A | 11/2020 |
| CN | 113224486 | A | 8/2021 |
| SE | 1950508 | A1 | 10/2020 |
| WO | 2020148683 | A1 | 7/2020 |

* cited by examiner

RF FILTER AND COMMUNICATION DEVICE HAVING THE SAME

TECHNICAL FIELD

The present disclosure generally relates to components of communication device, and more particularly, to a radio frequency (RF) filter and a communication device having the RF filter.

BACKGROUND

This section introduces aspects that may facilitate better understanding of the present disclosure. Accordingly, the statements of this section are to be read in this light and are not to be understood as admissions about what is in the prior art or what is not in the prior art.

Base station (BS) is an important part of a mobile communication system, and may include a radio unit (RU) and an antenna unit (AU). Considering the installation/fixation/occupation, smaller volume and lighter weight is always an important evolution direction in BS design, including legacy base station, street macro, micro, small cell and advanced antenna system (AAS).

With the development of 5th Generation (5G) communication, Multiple-Input and Multiple-Output (MIMO) technology is widely used in Sub-6 GHZ BS product, in which a large number of filters need to be integrated/embedded with AU or RU. There are many kinds of filter solutions that can be applied to BS, such as ceramic waveguide (CWG) filters, coaxial metal cavity filters, Monoblock filters, bulk acoustic wave (BAW) filters, surface acoustic wave (SAW) filters, etc.

To get size/weight and cost benefit, especially a good performance, small size metal filter is an irreplaceable solution. It can be soldered onto radio mother board (MOB), antenna calibration (AC) board or power splitter board, which will reduce the radio size and weight. It also can be connected by connectors with other radio components, same as macro station.

The resonator shape and coupling method has big influence on the performance of filter and the size of filter. To get a smaller size filter with better performance is the main orientation of filter design in 5G era.

Small coaxial metal cavity filters cannot get better volume, and the assembly process is complex because all resonators need to be mounted on chassis separately. The existing scheme of small size metal filers usually use a metal filter with air-strip line resonator, which has better weight/size and cost compared with coaxial metal cavity filters, and also has better performance compared with CWG filters. It is a good filter solution for the next generation of 5G NR, to get better loss with smaller size. The integrated air-strip line metal resonator can be soldered on a chassis directly one time, without complex assembly process. However, the normal air-strip line metal filters need extra negative coupling pieces to achieve transmission zero, which increases the size and the cost of the filters.

Another type of small size metal filter can achieve negative coupling by changing the direction of resonators, and the resonators may be produced with filter chassis one time together or may be produced separately. It is not easy to get desired coupling of different filters, and there is so much spurious coupling which may bring more parasitic zero. Thus, this kind of filter is hard to tune in production to get a good performance. Sometimes, the coupling of resonators is not enough.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a small size RF filter, which can easily achieve negative coupling of resonators.

According to a first aspect of the disclosure, there is provided an RF filter, comprising a chassis that defines a cavity and a plurality of resonators that are disposed in the cavity. At least one resonator comprises a body part that extends in a first plane from a first end to an opposite second end along a first direction, an enlarged portion that is provided at the second end and extends in the first plane along a second direction substantially perpendicular to the first direction so as to have a larger width in the second direction than the body part, and a folded portion that is formed by bending along a lateral edge of the enlarged portion at an angle of about 90° so as to extend in a second plane substantially perpendicular to the the second direction. The folded portion plays a role in forming a coupling of the resonator with an adjacent resonator. The body part, the enlarged portion and the folded portion are made of a metal strip line, or a strip-line made of non-metal base with a metallized surface.

In an embodiment of the disclosure, the at least one resonator further comprises a second folded portion that is formed by bending along another lateral edge of the enlarged portion at an angle of about 90° so as to extend in a third plane substantially parallel to the second plane.

In an embodiment of the disclosure, the at least one resonator further comprises a protruding portion that is provided at an intermediate section of the body part and extends in the first plane from a lateral side of the body part along the second direction.

In an embodiment of the disclosure, the protruding portion and the folded portion are arranged at opposite sides of the body part.

In an embodiment of the disclosure, the at least one resonator further comprises a third folded portion that is formed by bending along a lateral edge of the protruding portion at an angle of about 90°.

In an embodiment of the disclosure, the third folded portion and the folded portion are bent toward opposite sides of the body part.

In an embodiment of the disclosure, the third folded portion and the folded portion are bent toward the same side of the body part.

In an embodiment of the disclosure, the at least one resonator further comprises a second protruding portion that is provided at the intermediate section of the body part and extends in the first plane from another lateral side of the body part along the second direction.

In an embodiment of the disclosure, the protruding portion and the second protruding portion are provided at different positions of the body part in the first direction.

In an embodiment of the disclosure, the at least one resonator further comprises a fourth folded portion that is formed by bending along a lateral edge of the second protruding portion at an angle of about 90°.

In an embodiment of the disclosure, the at least one resonator further comprises a raised portion that extends in the first plane from a top side of the enlarged portion along the first direction.

In an embodiment of the disclosure, the at least one resonator includes a first resonator and a second resonator, and the body part of the first resonator is coplanar with the body part of the second resonator.

In an embodiment of the disclosure, the folded portion of the first resonator is bent at a lateral side of the enlarged portion that is adjacent to the second resonator, the folded portion of the second resonator is bent at a lateral side of the enlarged portion that is adjacent to the first resonator, and the folded portion of the first resonator and the folded portion of the second resonator substantially face to each other and form an electrical coupling of the first and second resonators.

In an embodiment of the disclosure, the folded portion of the first resonator is bent at a lateral side of the enlarged portion that is adjacent to the second resonator, the folded portion of the second resonator is bent at a lateral side of the enlarged portion that is away from the first resonator, and the folded portion of the first resonator and the folded portion of the second resonator form a magnetic coupling of the first and second resonators.

In an embodiment of the disclosure, the first resonator and the second resonator are connected to each other at the respective first ends thereof through a connecting part, the connecting part extends in the first plane with respect to the first resonator and the second resonator, and the first resonator, the second resonator and the connecting part are also made of a single strip line.

In an embodiment of the disclosure, the first resonator and the second resonator are separately produced.

In an embodiment of the disclosure, the at least one resonator includes a first resonator and a second resonator, and the body part of the first resonator is parallel to the body part of the second resonator.

In an embodiment of the disclosure, the folded portion of the first resonator and the folded portion of the second resonator form a magnetic coupling of the first and second resonators.

In an embodiment of the disclosure, the first resonator and the second resonator are connected to each other at the respective first ends thereof through a connecting part, the connecting part extends in a direction perpendicular to the first plane with respect to the first resonator or the second resonator, and the first resonator, the second resonator and the connecting part are made of a single strip line.

In an embodiment of the disclosure, the first resonator and the second resonator are separately produced.

According to a second aspect of the disclosure, there is provided a communication device, which comprises at least one RF filter according to the first aspect.

In an embodiment of the disclosure, the at least one RF filter is soldered on a radio board or an antenna board or is connected to the radio board or the antenna board by an RF connector.

BRIEF DESCRIPTION OF THE DRAWINGS

These and other objects, features and advantages of the disclosure will become apparent from the following detailed description of illustrative embodiments thereof, which are to be read in connection with the accompanying drawings, in which.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1A:
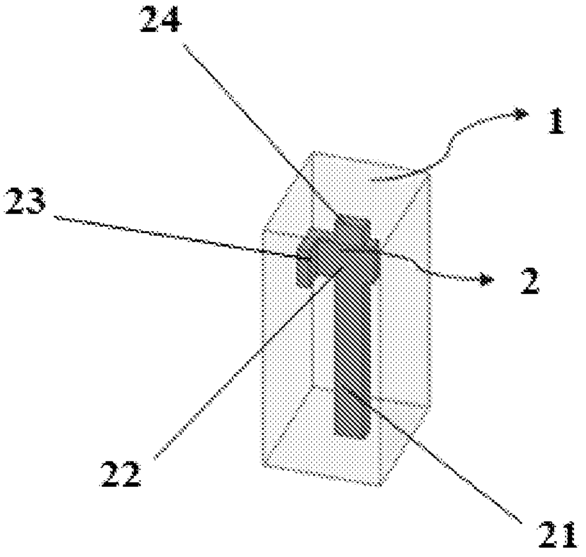
FIG. 1A shows a resonator in an RF filter according to a first embodiment of the disclosure.

FIG. 1A shows a resonator in an RF filter according to a first embodiment of the disclosure. As shown in FIG. 1A, a chassis 1 defines a cavity, and the resonator 2 is disposed in the cavity. As an example, the chassis 1 may be made of a metal such as aluminum through an extrusion molding process. The resonator 2 in the first embodiment comprises a body part 21, an enlarged portion 22, a folded portion 23, and a raised portion 24, all of which are made of a strip line which may be a metal strip line or a strip-line made of non-metal base with a metallized surface. The chassis 1 can also be made of non-metal base with a metallized surface.

The body part 21 extends in a first plane from a first end (bottom side) to an opposite second end (top side) along a first direction. The first end of the resonator 2 is mounted (for example, soldered or welded) on a bottom of the chassis 1. The second end of the resonator 2 is spaced from a top of the chassis 1. The enlarged portion 22 is provided at the second end of the body part 21, and extends in the first plane along a second direction substantially perpendicular to the first direction. The enlarged portion 22 has a larger width in the second direction than the body part 21. The folded portion 23 is formed by bending the strip line along a lateral edge (on the left side) of the enlarged portion 22 at an angle of about 90° so as to extend in a second plane substantially perpendicular to the second direction. The “lateral edge” herein refers to an edge at an end surface of the enlarged portion 22 in the second direction. As will be described later, the folded portion 23 plays a role in forming a coupling, especially an electrical coupling, of the resonator 2 with another adjacent resonator in the cavity. The raised portion 24 extends in the first plane from a top surface of the enlarged portion 22 along the first direction.

Figure 1B:
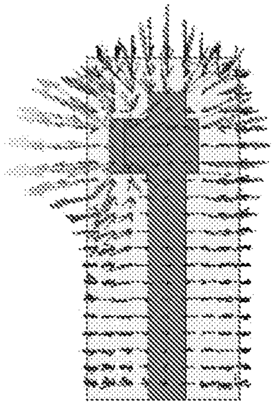
FIG. 1B shows an electric field around the resonator.
Figure 1C:
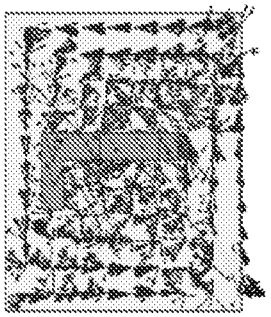
FIG. 1C shows a magnetic field around the resonator.

FIG. 1B shows an electric field around the resonator 2 shown in FIG. 1A, and FIG. 1C shows a magnetic field around the resonator 2. As can be seen from FIG. 1B, the folded portion 23 brings a stronger electric field, which makes it possible to get a better harmonic performance.

Figure 2A:
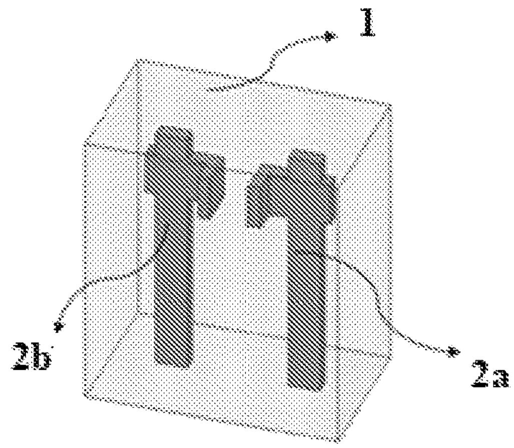
FIG. 2A shows two resonators in an RF filter according to a second embodiment of the disclosure.

FIG. 2A shows two resonators in an RF filter according to a second embodiment of the disclosure. As shown in FIG. 2A, each of a first resonator 2*a* and a second resonator 2*b* has a body part, an enlarged portion, a folded portion, and a raised portion, like the resonator 2 in the first embodiment. However, the reference numerals denoting the body part, the enlarged portion, the folded portion, and the raised portion are omitted in FIG. 2A.

In the second embodiment, the body part of the first resonator 2*a* is coplanar with the body part of the second resonator 2*b*. A first end of the first resonator 2*a* and the second resonator 2*b* is mounted on a bottom of the chassis 1. A second end of the first resonator 2*a* and the second resonator 2*b* is spaced from a top of the chassis 1.

Preferably, the first end of the the first resonator 2*a* is connected to the first end of the second resonator 2*b* through a connecting part (not shown), and the first resonator 2*a*, the second resonator 2*b* and the connecting part are integratedly made of a single strip line. That is, the connecting part extends in the same plane in which the body part of the first resonator 2*a* and the second resonator 2*b* extends. The first resonator 2*a* and the second resonator 2*b* may also be separately produced, and then may be soldered together or not.

In the second embodiment, the folded portion of the first resonator 2*a* is bent at a lateral edge on the left side of the enlarged portion that is adjacent to the second resonator 2*b*, and the folded portion of the second resonator 2*b* is bent at a lateral edge on the right side of the enlarged portion that is adjacent to the first resonator 2*a*. Accordingly, the folded portion of the first resonator 2*a* and the folded portion of the second resonator 2*b* substantially face to each other, and thus form an electrical coupling of the first and second resonators 2*a*, 2*b*.

Figure 2B:
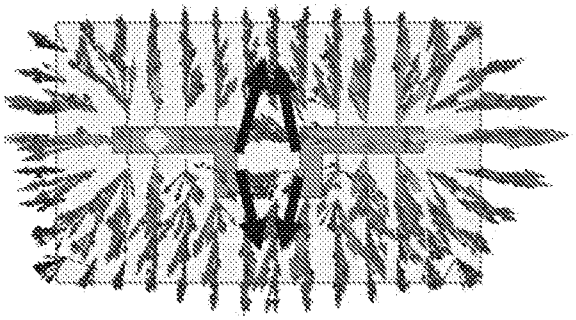
FIG. 2B shows an electric field around the resonators.
Figure 2C:
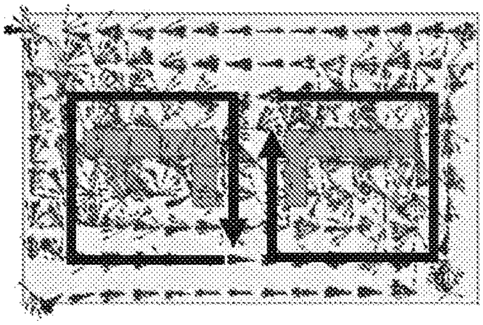
FIG. 2C shows a magnetic field around the resonators.

FIG. 2B shows an electric field around the resonators 2*a*, 2*b* shown in FIG. 2A, and FIG. 2C shows a magnetic field around the resonators 2*a*, 2*b*. It can be seen that the magnetic field of the resonator 2*a* counteracts the magnetic field of the resonator 2*b* in a region between the folded portions of the two resonators 2*a*, 2*b*, and the electric field is partially strengthened. Thus, the two resonators 2*a*, 2*b* are electrically coupled to each other.

Figure 3A:
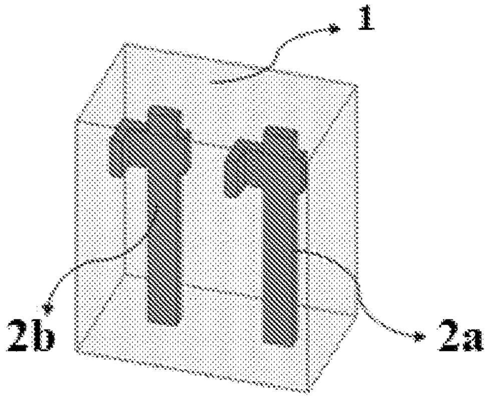
FIG. 3A shows two resonators in an RF filter according to a third embodiment of the disclosure.

FIG. 3A shows two resonators in an RF filter according to a third embodiment of the disclosure. As shown in FIG. 3A, each of a first resonator 2*a* and a second resonator 2*b* has a body part, an enlarged portion, a folded portion, and a raised portion, like the resonator 2 in the first embodiment. However, the reference numerals denoting the body part, the enlarged portion, the folded portion, and the raised portion are omitted in FIG. 3A.

In the third embodiment, the body part of the first resonator 2*a* is coplanar with the body part of the second resonator 2*b*. A first end of the first resonator 2*a* and the second resonator 2*b* is mounted on a bottom of the chassis 1.

Preferably, the first end of the the first resonator 2*a* is connected to the first end of the second resonator 2*b* through a connecting part (not shown), and the first resonator 2*a*, the second resonator 2*b* and the connecting part are integratedly made of a single strip line. That is, the connecting part extends in the same plane in which the body part of the first resonator 2*a* and the second resonator 2*b* extends. The first resonator 2*a* and the second resonator 2*b* may also be separately produced.

In the third embodiment, the folded portion of the first resonator 2*a* is bent at a lateral edge on the left side of the enlarged portion that is adjacent to the second resonator 2*b*, and the folded portion of the second resonator 2*b* is bent at a lateral edge on the left side of the enlarged portion that is away from the first resonator 2*a*.

Figure 3B:
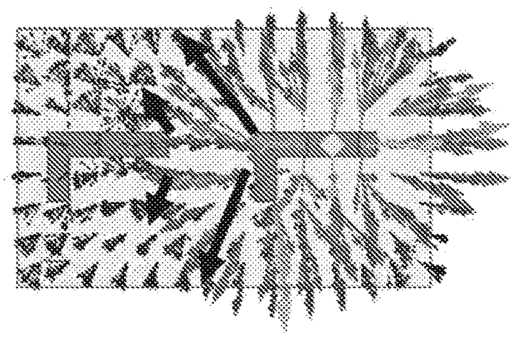
FIG. 3B shows an electric field around the resonators.
Figure 3C:
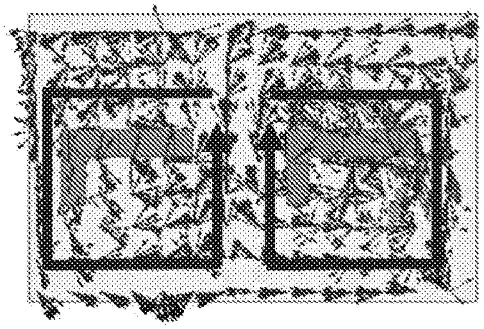
FIG. 3C shows a magnetic field around the resonator.

FIG. 3B shows an electric field around the resonators 2*a*, 2*b* shown in FIG. 3A, and FIG. 3C shows a magnetic field around the resonators 2*a*, 2*b*. It can be seen that the magnetic filed is stronger than the electronic filed. Thus, the two resonators 2*a*, 2*b* are magnetically coupled to each other.

Figure 4A:
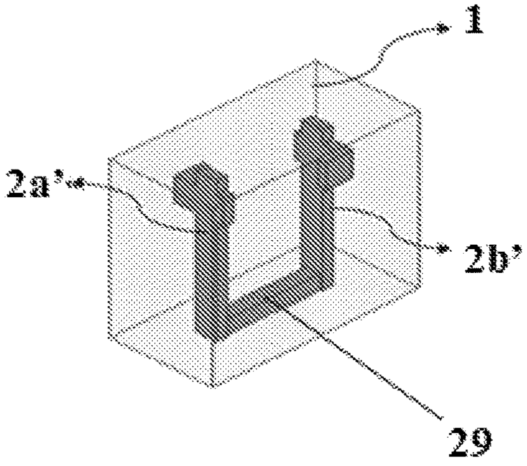
FIG. 4A shows two resonators in an RF filter according to a fourth embodiment of the disclosure.

FIG. 4A shows two resonators in an RF filter according to a fourth embodiment of the disclosure. As shown in FIG. 4A, each of a first resonator 2*a*' and a second resonator 2*b*' has a body part, an enlarged portion, a folded portion, and a raised portion, like the resonator 2 in the first embodiment. However, the reference numerals denoting the body part, the enlarged portion, the folded portion, and the raised portion are omitted in FIG. 4A.

In the fourth embodiment, the body part of the first resonator 2*a*' is parallel to the body part of the second resonator 2*b*'. A first end of the first resonator 2*a*' and the second resonator 2*b*' is mounted on a bottom of the chassis 1. The first end of the the first resonator 2*a*' is connected to the first end of the second resonator 2*b*' through a connecting part 29, and the first resonator 2*a*', the second resonator 2*b*' and the connecting part 29 are integratedly made of a single strip line. The connecting part 29 extends in a direction perpendicular to the plane in which the body part of the first resonator 2*a*' or the body part of the second resonator 2*b*' extends. The first resonator 2*a*' and the second resonator 2*b*' may also be separately produced.

In the fourth embodiment, the folded portion of the first resonator 2*a*' is bent at a lateral edge (on the left side in FIG. 4A) of the enlarged portion, and the folded portion of the second resonator 2*b*' is bent at a lateral edge (on the right side in FIG. 4A) of the enlarged portion.

Figure 4B:
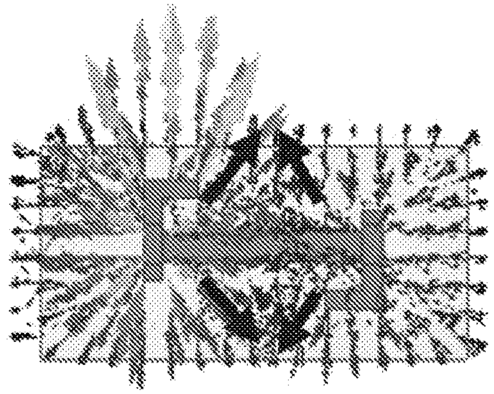
FIG. 4B shows an electric field around the resonators.
Figure 4C:
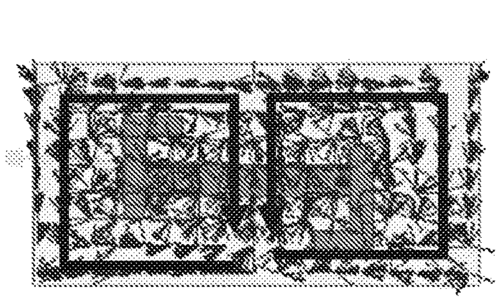
FIG. 4C shows a magnetic field around the resonator.

FIG. 4B shows an electric field around the resonators 2*a*', 2*b*' shown in FIG. 3A, and FIG. 4C shows a magnetic field around the resonators 2*a*,' 2*b*'. It can be seen that the magnetic field is stronger than the electronic filed. Thus, the two resonators 2*a*', 2*b*' are magnetically coupled to each other.

Figure 5A:
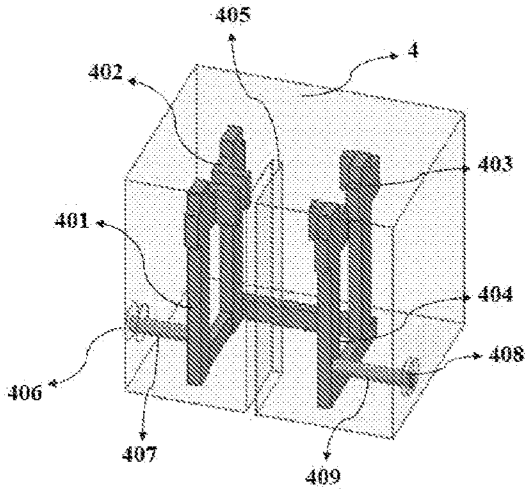
FIG. 5A, FIG. 5B and FIG. 5C show a perspective view, a front view, and a top view respectively, of an RF filter according to a fifth embodiment of the disclosure.
Figure 5B:
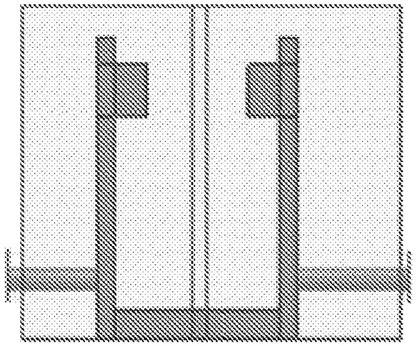
Figure 5C:
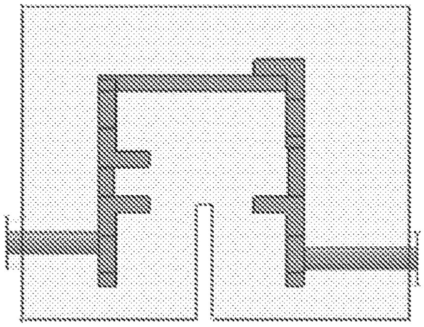

FIG. 5A shows a perspective view of an RF filter according to a fifth embodiment of the disclosure, FIG. 5B shows a front view of the filter, and FIG. 5C shows a top view of the filter.

As can be seen from FIGS. 5A-5C, the RF filter according to the fifth embodiment comprises a chassis 4 defining a cavity and four resonators 401-404 disposed in the cavity. Each of the four resonators 401-404 has a body part, an enlarged portion, a folded portion, and a raised portion, like the resonator 2 in the first embodiment, and the reference numerals denoting the body part, the enlarged portion, the folded portion, and the raised portion are omitted. With regard to the configuration (especially the relative position of the enlarged portions) of two resonators, the resonators 401 and 402 are similar to the resonators 2*a*, 2*b* of the second embodiment shown in FIG. 2A, the resonators 403 and 404 are similar to the resonators 2*a*, 2*b* of the third embodiment shown in FIG. 3A, and the resonators 402 and 403 are similar to the resonators 2*a*', 2*b*' of the fourth embodiment shown in FIG. 4A.

The four resonators 401-404 in this embodiment are integratedly made of a single strip line. Thus, the first end of the resonator 401 is connected to the first end of the resonator 402, the first end of the resonator 402 is connected to the first end of the resonator 403, and the first end of the resonator 403 is connected to the first end of the resonator 404. The first end of the resonator 401 and the first end of the resonator 404 are not connected to each other. Between the resonator 401 and the resonator 404, a chassis iris 405 is provided, which can control the coupling of resonators 401 and 404, and can avoid unnecessary coupling of resonators 402 and 404 or resonators 401 and 403.

The RF filter in this embodiment further comprises an RF connector 406 which is connected to the resonator 401 through an input connecting rod 407, and another RF connector 408 which is connected to the resonator 404 through an output connecting rod 409. The RF connectors 406 and 408 will be connected to other radio components. In other embodiments, the RF connectors may be dispensed with, and the RF filter can be soldered on a radio board or an antenna board directly by a solder pad. Although not shown, a metal strip line low pass filter can be added at the input/output area.

Figure 6:
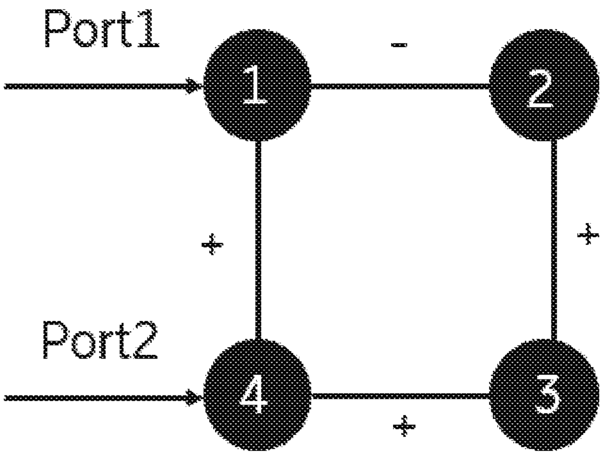
FIG. 6 is a schematic diagram illustrating a topology of the RF filter according to the fifth embodiment of the disclosure.

FIG. 6 is a schematic diagram illustrating a topology of the RF filter shown in FIG. 5A. The resonator sequence number 1-4 in FIG. 6 refer to the resonators 401-404, respectively. As can be seen from FIG. 6, in the 4-pole RF filter, the coupling between Resonator1 and Resonator2 is electronic coupling (−polarity), and the coupling between other adjacent resonators all is magnetic coupling (+polarity). If needed, a cross coupling may be provided between Resonator1 and Resonator3 or between Resonator 2 and Resonator 4.

Figure 7:
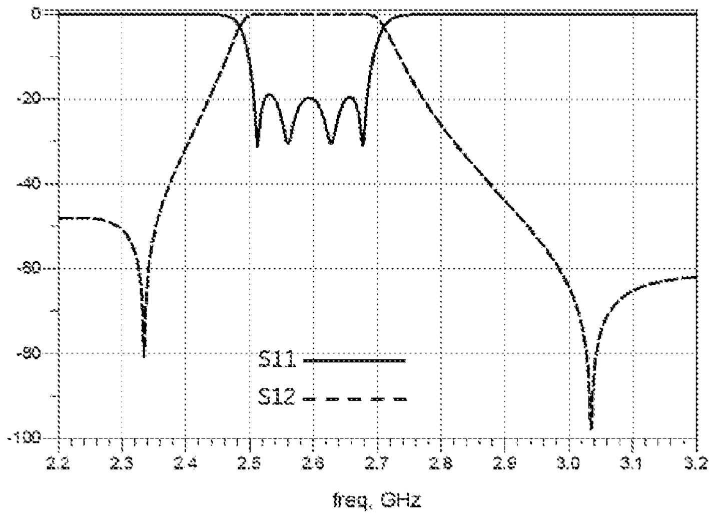
FIG. 7 shows a simulation frequency response curve of the RF filter according to the fifth embodiment of the disclosure.

FIG. 7 shows a simulation frequency response curve of the RF filter. As can be seen from FIG. 7, the coupling polarity mentioned above can bring two transmission zeros.

In the fifth embodiment, all the resonators 401-404 are integratedly made of a single strip line. However, the present disclosure is not limited to this.

Figure 8:
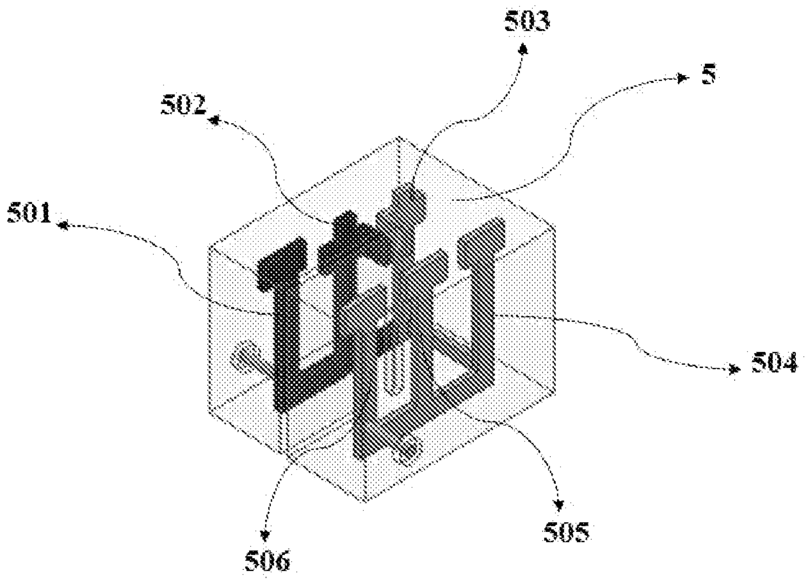
FIG. 8 shows a perspective view of an RF filter according to a sixth embodiment of the disclosure.

For example, FIG. 8 shows a perspective view of an RF filter according to a sixth embodiment of the disclosure. As can be seen from FIG. 8, the filter according to the sixth embodiment comprises a chassis 5 defining a cavity, and six resonators 501-506 disposed in the cavity. In this embodiment, the resonators 501 and 502 form a first resonator group, and the resonators 503-506 form a second resonator group. The two resonator groups are not produced by cutting and folding the same strip line. In contrast, the first resonator group and the second resonator group are separately produced, for example, by cutting and folding different strip line.

As shown in FIG. 8, the resonator 502 of the first resonator group and the resonator 503 of the second resonator group, which are adjacent to each other, have a configuration similar to that of the resonator 2*a*, 2*b* in the second embodiment shown in FIG. 2A. In particular, the resonators 502 and 503 have respective folded portions that substantially face to each other and thus form an electrical coupling of the resonators 502 and 503.

In FIG. 8, the resonators 501 and 504-506 do not have any folded portion. However, those skilled in the relevant art will recognize that a folded portion may be provided at one or more of the resonators 501 and 504-506 as needed, so as to form an electrical coupling or a magnetic coupling of adjacent resonators.

Figure 9:
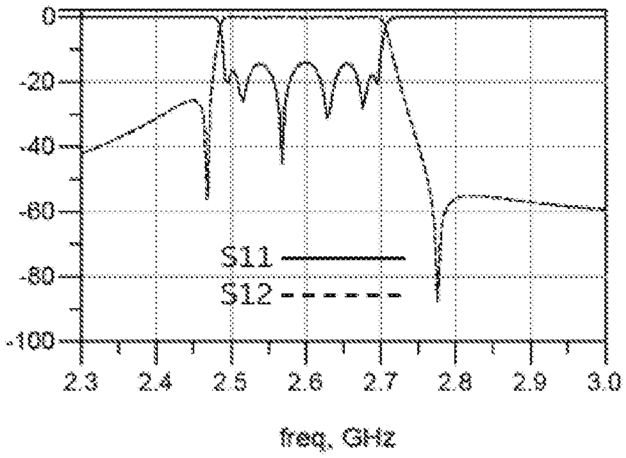
FIG. 9 shows a simulation frequency response curve of the RF filter according to the sixth embodiment of the disclosure.

FIG. 9 shows a frequency response curve of the RF filter shown in FIG. 8. As can be seen from FIG. 9, the RF filter shown in FIG. 8 can bring two transmission zeros.

FIGS. 10A-10I show different variants of a resonator in an RF filter according to the present disclosure.

Figure 10A:
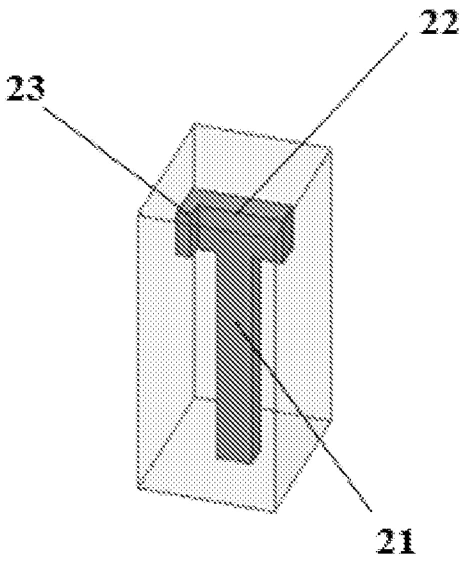
FIGS. 10A-10I show different variants of a resonator in an RF filter according to an embodiment of the disclosure.

The resonator shown in FIG. 10A differs from the resonator shown in FIG. 1A in that the raised portion 24 is dispensed with. Other parts or portions are the same as those in FIG. 1A, and detailed description thereof will not be repeated. This applies to each of FIGS. 10B-10I.

Figure 10B:
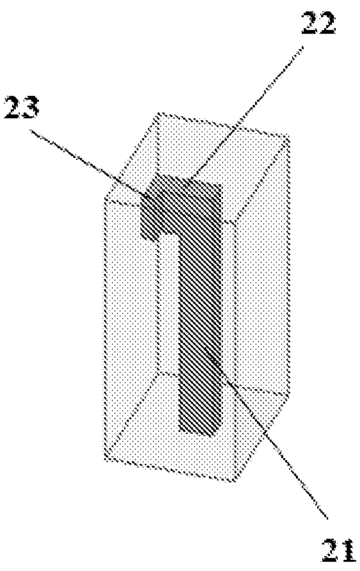

The resonator shown in FIG. 10B differs from the resonator shown in FIG. 10A in that the enlarged portion 22 only extends toward the left side of the body part 21, and does protrude beyond the right surface of the body part 21.

Figure 10C:
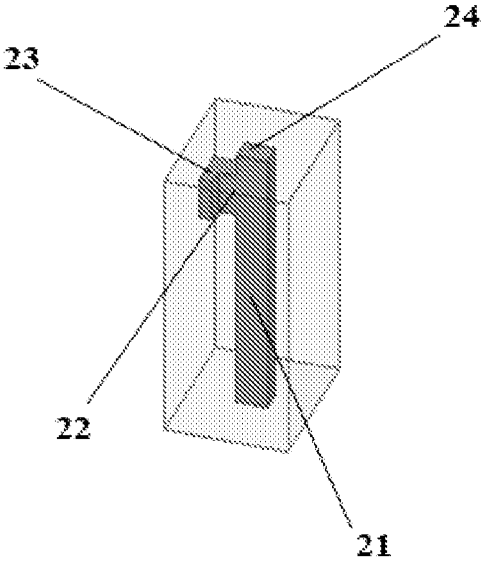

The resonator shown in FIG. 10C differs from the resonator shown in FIG. 1A in that the enlarged portion 22 only extends toward the left side of the body part 21, and does protrude beyond the right surface of the body part 21.

Figure 10D:
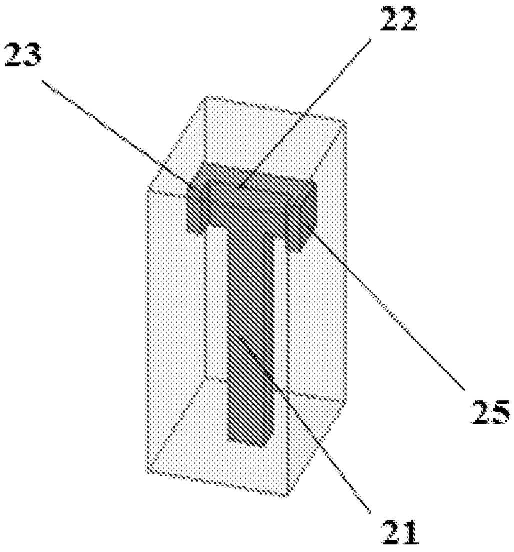

The resonator shown in FIG. 10D differs from the resonator shown in FIG. 10A in that in addition to the folded portion 23 formed by bending along the lateral edge on the left side of the enlarged portion 22 to extend in the second plane, there is further provided a second folded portion 25, which is formed by bending along another lateral edge on the right side of the enlarged portion 22 at an angle of about 90° so as to extend in a third plane substantially parallel to the second plane. The folded portion 23 and the second folded portion 25 are substantially symmetrical with respect to the body part 21.

Figure 10E:
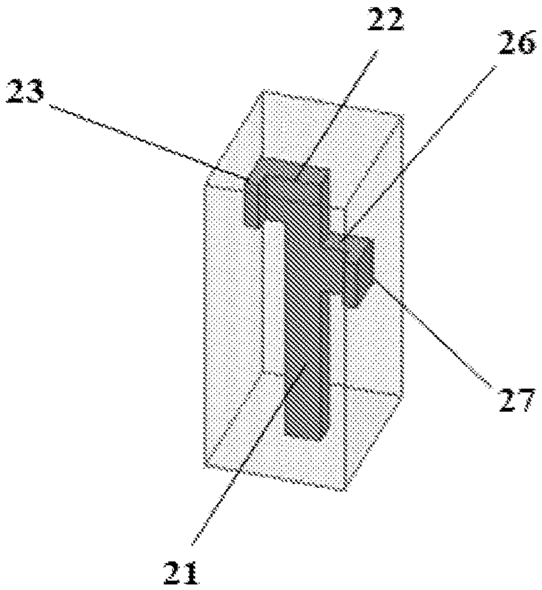

The resonator shown in FIG. 10E differs from the resonator shown in FIG. 10B in that there are further provided a protruding portion 26 and a third folded portion 27. The protruding portion 26 is provided at an intermediate section of the body part 21 between the first end and the second end, and extends in the first plane from the right surface of the body part 21 along the second direction. The third folded portion 27 is formed by bending along a lateral edge on the right side of the protruding portion 26 at an angle of about 90° toward the front side of the body part 21, so as to extend in a plane substantially perpendicular to the second direction. In this variant, the protruding portion 26 and the folded portion 23 are arranged at opposite sides of the body part 21, and the third folded portion 27 and the folded portion 23 are bent toward the same side of the body part 21.

Figure 10F:
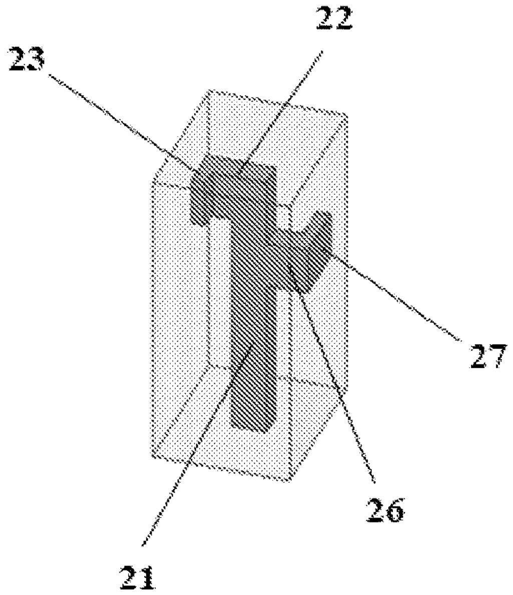

The resonator shown in FIG. 10F differs from the resonator shown in FIG. 10E in that the third folded portion 27 and the folded portion 23 are bent toward opposite sides of the body part 21.

Figure 10G:
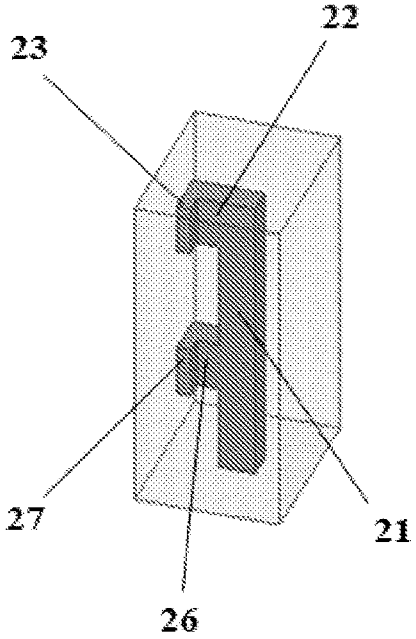

The resonator shown in FIG. 10G differs from the resonator shown in FIG. 10E in that the protruding portion 26 and the folded portion 23 are provided at the same side of the body part 21. In this variant, the third folded portion 27 and the folded portion 23 are bent toward the same side of the body part 21. Alternatively, the third folded portion 27 and the folded portion 23 may be bent toward opposite sides of the body part 21.

Figure 10H:
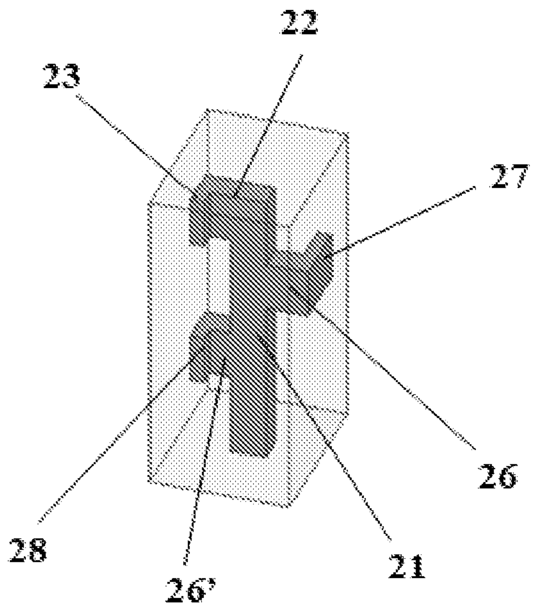

The resonator shown in FIG. 10H differs from the resonator shown in FIG. 10F in that there are further provided a second protruding portion 26' and a fourth folded portion 28. The second protruding portion 26' and the fourth folded portion 28 are the same as the protruding portion 26 and the third folded portion 27 of the resonator shown in FIG. 10G. In this variant, the protruding portion 26 is arranged between the enlarged portion 22 and the second protruding portion 26' in the first direction. Alternatively, the second protruding portion 26' may be arranged between the enlarged portion 22 and the protruding portion 26 in the first direction, or the protruding portion 26 and the second protruding portion 26' may be arranged at substantially the same position of the body part 21 in the first direction.

Figure 10I:
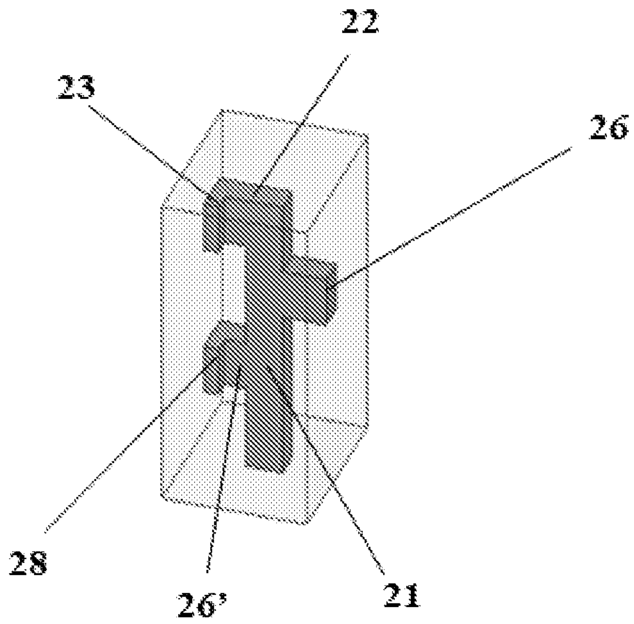

The resonator shown in FIG. 10I differs from the resonator shown in FIG. 10H in that the third folded portion 27 is dispensed with.

While various resonators are illustrated and described above, those skilled in the relevant art will conceive of similar resonators that have different branches of enlarged portion and/or folded portion.

At least one resonator of the RF filter according to the present disclosure may have a configuration as described above. The present disclosure also relates to communication device comprising at least one such RF filter, such as a radio unit or an antenna unit.

Advantages of embodiments of the present disclosure will be described below.

According to embodiments of the present disclosure, at least one resonator of the filter is made of a metal strip line, or a strip-line made of non-metal base with a metallized surface and comprises a body part 21, an enlarged portion 22 and a folded portion 23 as described above. With such a configuration, it is convenient to get a desired coupling polarity by setting the location and direction of the folded portions of adjacent resonators. For example, if the folded portions of two adjacent resonators are arranged to face to each other as shown in FIG. 2A, a negative coupling (i.e., an electrical coupling) will be achieved. If no such folded portions that face to each other, the coupling will be a magnetic coupling.

Therefore, a negative coupling can be easily achieved without the need of extra negative coupling pieces. Thus, the size, weight, and cost of the filter is reduced compared with traditional metal filters. On the other hand, the performance of the filter, such as harmonic and insertion loss, is improved compared with CWG filters.

For the RF filter according to the present disclosure, a plastic material can be added on the top/bottom side of resonators. The plastic material will bring higher dielectric constant compared with air in the cavity, so that the filter size can be further reduced.

For the RF filter according to the present disclosure, multiple resonators may be produced one time from a single strip line, and then be bent in different directions to get desired coupling polarity. The resonators also can be separated to several resonator groups, and then can be soldered/welded together.

It is possible to get flexible transmission zeros, and the negative coupling between two resonators can be adjusted by changing the size of facing area of two folded portions and/or the distance between the two folded portions. This enables to realize complex filter according different filter specification.

The resonator length and numbers of branch will influence the frequency of the filter, which is benefit to the filter size reduction.

The resonator length and numbers of branch will also influence the harmonic of the resonator. The harmonic amplitude can be reduced through tuning the resonator harmonic to different frequency.

The RF filter according to the present disclosure can be tuned by tuning screws on a filter cover or a filter chassis in production. The tuning method also can be achieved by bending tuning tabs on the filter cover.

For the RF filter according to the present disclosure, a metal strip line low pass filter or a notch branch can be added at the input/output area to get better out of band attenuation.

The RF filter according to the present disclosure can be soldered on a PCB, such as a radio board or an antenna board, or can be connected to other radio components by RF connectors. This provides a flexible assembling solution for the filter, as well as high level building practice solution.

The RF filter according to the present disclosure has better reliability and robustness.

References in the present disclosure to "an embodiment", "another embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A radio frequency (RF) filter, comprising a chassis that defines a cavity, and a plurality of resonators that are disposed in the cavity, wherein at least one resonator comprises a body part that extends in a first plane from a first end to an opposite second end along a first direction, an enlarged portion that is provided at the second end and extends in the first plane along a second direction substantially perpendicular to the first direction so as to have a larger width in the second direction than the body part, and a folded portion that is formed by bending along a lateral edge of the enlarged portion at an angle of about 90° so as to extend in a second plane substantially perpendicular to the second direction, wherein the folded portion plays a role in forming a coupling of the resonator with an adjacent resonator, and wherein the body part, the enlarged portion and the folded portion are made of a metal strip line, or a strip-line made of non-metal base with a metallized surface.

2. The RF filter of claim 1, wherein the at least one resonator further comprises a second folded portion that is formed by bending along another lateral edge of the enlarged portion at an angle of about 90° so as to extend in a third plane substantially parallel to the second plane.

3. The RF filter of claim 1, wherein the at least one resonator further comprises a raised portion that extends in the first plane from a top side of the enlarged portion along the first direction.

4. A communication device, comprising at least one RF filter according to claim 1.

5. The RF filter of claim 1, wherein the at least one resonator further comprises a protruding portion that is provided at an intermediate section of the body part and extends in the first plane from a lateral side of the body part along the second direction.

6. The RF filter of claim 5, wherein the protruding portion and the folded portion are arranged at opposite sides of the body part.

7. The RF filter of claim 5, wherein the at least one resonator further comprises a third folded portion that is formed by bending along a lateral edge of the protruding portion at an angle of about 90°.

8. The RF filter of claim 7, wherein the third folded portion and the folded portion are bent toward opposite sides of the body part.

9. The RF filter of claim 7, wherein the third folded portion and the folded portion are bent toward the same side of the body part.

10. The RF filter of claim 5, wherein the at least one resonator further comprises a second protruding portion that is provided at the intermediate section of the body part and extends in the first plane from another lateral side of the body part along the second direction.

11. The RF filter of claim 10, wherein the protruding portion and the second protruding portion are provided at different positions of the body part in the first direction.

12. The RF filter of claim 10, wherein the at least one resonator further comprises a fourth folded portion that is formed by bending along a lateral edge of the second protruding portion at an angle of about 90°.

13. The RF filter of claim 1, wherein the at least one resonator includes a first resonator and a second resonator, and the body part of the first resonator is coplanar with the body part of the second resonator.

14. The RF filter of claim 13, wherein the folded portion of the first resonator is bent at a lateral side of the enlarged portion that is adjacent to the second resonator, the folded portion of the second resonator is bent at a lateral side of the enlarged portion that is adjacent to the first resonator, and the folded portion of the first resonator and the folded portion of the second resonator substantially face to each other and form an electrical coupling of the first and second resonators.

15. The RF filter of claim 13, wherein the folded portion of the first resonator is bent at a lateral side of the enlarged portion that is adjacent to the second resonator, the folded portion of the second resonator is bent at a lateral side of the enlarged portion that is away from the first resonator, and the folded portion of the first resonator and the folded portion of the second resonator form a magnetic coupling of the first and second resonators.

16. The RF filter of claim 13, wherein the first resonator and the second resonator are connected to each other at the respective first ends thereof through a connecting part, the connecting part extends in the first plane with respect to the first resonator and the second resonator, and the first resonator, the second resonator and the connecting part are made of a single strip line.

17. The RF filter of claim 13, wherein the first resonator and the second resonator are separately produced.

18. The RF filter of claim 1, wherein the at least one resonator includes a first resonator and a second resonator, and the body part of the first resonator is parallel to the body part of the second resonator.

19. The RF filter of claim 18, wherein the folded portion of the first resonator and the folded portion of the second resonator form a magnetic coupling of the first and second resonators.

20. The RF filter of claim 18, wherein the first resonator and the second resonator are connected to each other at the respective first ends thereof through a connecting part, the connecting part extends in a direction perpendicular to the first plane with respect to the first resonator or the second resonator, and the first resonator, the second resonator and the connecting part are made of a single strip line.

* * * * *